(12) United States Patent
Billing et al.

(10) Patent No.: US 8,807,913 B2
(45) Date of Patent: Aug. 19, 2014

(54) GRIPPING HEAD

(75) Inventors: Tobias Billing, Dösjebro (SE); Jesper Stormberg, Malmö (SE)

(73) Assignee: Tetra Laval Holdings & Finance SA, Pully (CH)

( * ) Notice: Subject to any disclaimer, the term of this patent is extended or adjusted under 35 U.S.C. 154(b) by 100 days.

(21) Appl. No.: 13/393,945

(22) PCT Filed: Sep. 1, 2010

(86) PCT No.: PCT/SE2010/000212
§ 371 (c)(1),
(2), (4) Date: Mar. 21, 2012

(87) PCT Pub. No.: WO2011/028161
PCT Pub. Date: Mar. 10, 2011

(65) Prior Publication Data
US 2012/0171008 A1    Jul. 5, 2012

(30) Foreign Application Priority Data
Sep. 4, 2009  (SE) ........................... 0901150

(51) Int. Cl.
*B65B 35/56* (2006.01)
*B65B 5/06* (2006.01)
*B65G 47/90* (2006.01)

(52) U.S. Cl.
USPC ............ 414/792.9; 294/81.61; 294/198; 294/81.52; 414/788.9; 901/39

(58) Field of Classification Search
USPC ............ 294/106, 108, 113, 81.2, 81.6, 81.61, 294/86.4; 414/406, 626, 731, 790.2, 792.7, 414/792.9, 799; 53/257, 258, 260, 261, 53/540; 901/31
See application file for complete search history.

(56) References Cited

U.S. PATENT DOCUMENTS 2,793,771 A * 5/1957 Ochs ........................... 414/564
3,086,808 A * 4/1963 Kaplan ...................... 294/67.31
(Continued)

FOREIGN PATENT DOCUMENTS

DE    19504708 A1    8/1996

OTHER PUBLICATIONS

International Search Report (PCT/ISA/210) issued on Dec. 14, 2010, by Swedish Patent Office as the International Searching Authority for International Application No. PCT/SE2010/000212.

(Continued)

*Primary Examiner* — Gregory Adams
(74) *Attorney, Agent, or Firm* — Buchanan Ingersoll & Rooney PC

(57) ABSTRACT

The present invention concerns a gripping head for packages of a wedge-like form. The invention also concerns a method of gripping a group of packages and transferring them into a box. The gripping head has side steering plates and pressure finger plates on two opposite sides. At one end of the gripping head a stop plate is arranged between the side steering plates and the pressure finger plates, while the opposite end is open. The side steering plates each has a number of steering plates and fingers of the pressure finger plates are placed on either side of the steering plates, which fingers are received in notches of the side steering plate. The fingers have folded lower ends. The side steering plates and the pressure finger plates are arranged mutually moveable bringing the folded lower ends of the fingers into and out of a position below the side steering plates.

10 Claims, 3 Drawing Sheets

(56) References Cited

U.S. PATENT DOCUMENTS

| | | | |
|---|---|---|---|
| 3,112,038 A * | 11/1963 | Breivik | 414/788.2 |
| 4,400,124 A * | 8/1983 | Greller | 414/790.2 |
| 4,852,242 A * | 8/1989 | Tella et al. | 483/59 |
| 5,088,877 A * | 2/1992 | Henk | 414/626 |
| 5,199,845 A | 4/1993 | Hirashima et al. | |
| 5,398,479 A | 3/1995 | Diete et al. | |
| 2005/0220599 A1 | 10/2005 | Job et al. | |
| 2007/0267880 A1 | 11/2007 | van Beusekom et al. | |

OTHER PUBLICATIONS

English language translation of a Notification of the Second Office Action dated Oct. 24, 2013 issued in the corresponding Chinese Patent Application No. 201080039432.3.

\* cited by examiner

GRIPPING HEAD

TECHNICAL FIELD

The present invention concerns a gripping head for a group of containers or packages and a method of transferring a number of packages from a first position into a second position by means of the gripping head.

BACKGROUND OF THE INVENTION

It is common to place a number of filled containers or packages from a filling machine in some kind of box or the like for further transportation. The packages are to be placed orderly inside the box.

It is known to grip packages by means of suction cups, move the packages to a new position and then release the packages. Thus, the filled packages may be placed in a box or the like by means of the suction cups. It is also known to use a mat having a number of small openings, and which mat is set under vacuum to grip packages. Some packages have a straw attached to one side of the package, which straw is to be removed and used while drinking. The known gripping means does not always work well with packages having straws.

SUMMARY

The present invention has been developed for use with packages of a wedge-like appearance and to function well also with packages having straws attached to them. A person skilled in the art realizes that the gripping head of the present invention could be adapted for use with packages of many different appearances.

One object of the present invention is to bring a number or group of packages together and then lift them as one unit and place them in a box. One further object is to position the group of packages in a correct position to be placed in the box. A further object is to provide a suitable means to grip and lift the group of packages.

The above objects are met by a gripping head comprising side steering plates and pressure finger plates on two opposite sides of the gripping head. The side steering plates and pressure finger plates are moved towards and away from each other to grip, move and release the group of packages. The gripping head transfers one group of packages at the time to the box, until the box is filled. Each group of packages normally forms one layer in the box.

By means of the gripping head of the present invention it is possible to transfer the packages to the box in a safe way, without dropping the packages. Furthermore, the gripping head of the present invention has low running and maintenance costs.

Further objects and advantages of the present invention will be obvious to a person skilled in the art reading the detailed description below of different embodiments.

BRIEF DESCRIPTION OF THE DRAWINGS

The invention will be described more closely below by way of example and with reference to the enclosed drawings. In the drawings.

DETAILED DESCRIPTION OF DIFFERENT EMBODIMENTS

Figure 1:
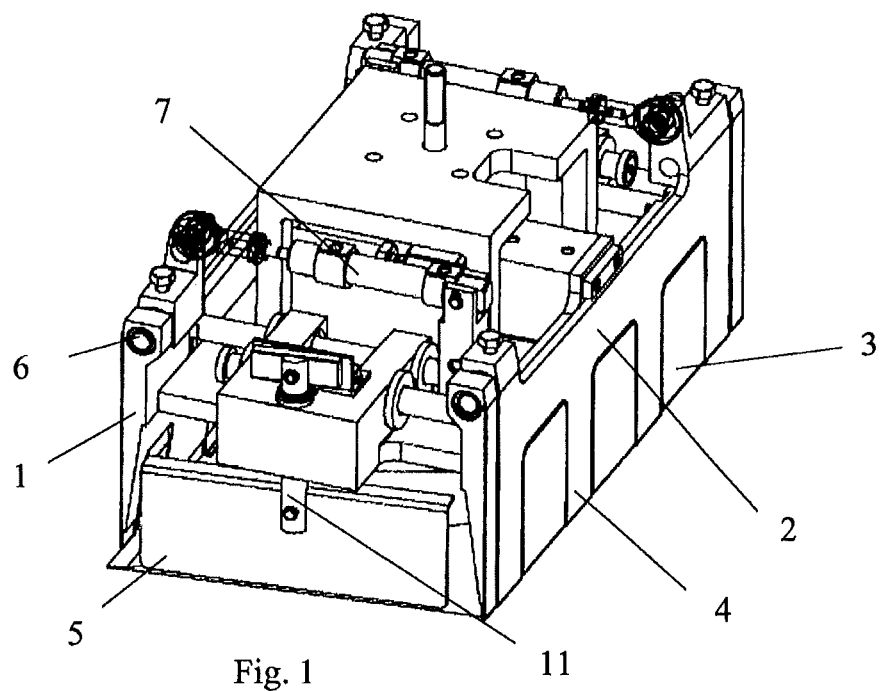
FIG. 1 is a perspective view of a gripping head according to the present invention.
Figure 2:
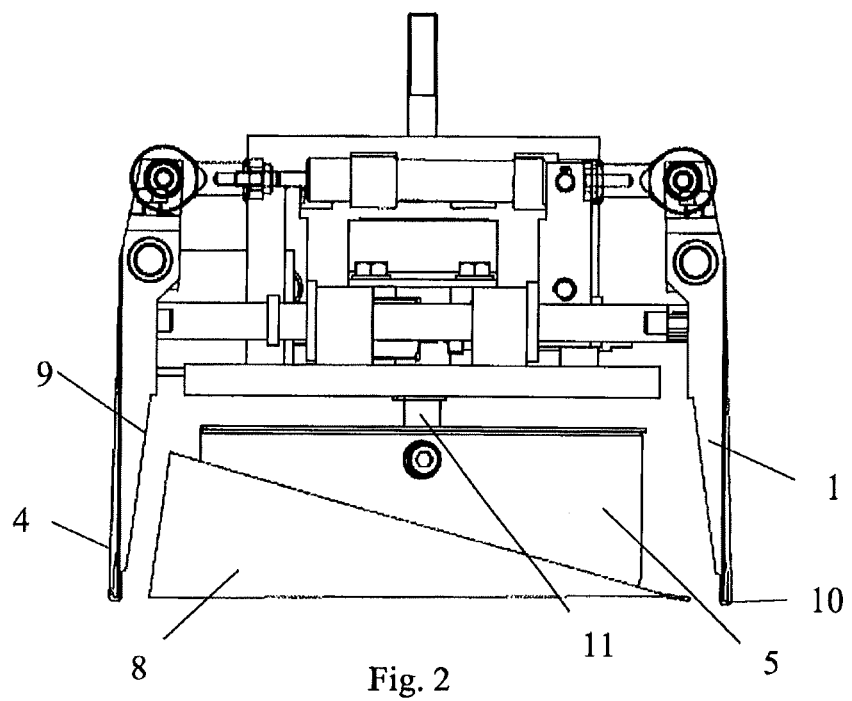
FIG. 2 is an end view of the gripping head of FIG. 1 in a first, open position.
Figure 3:
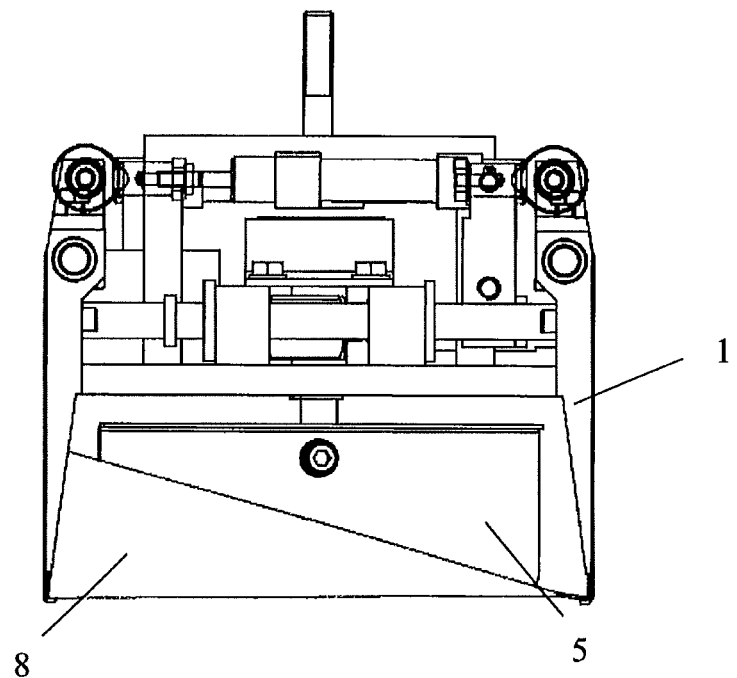
FIG. 3 is an end view of the gripping head of FIGS. 1 and 2 in a second, closed position.
Figure 4:
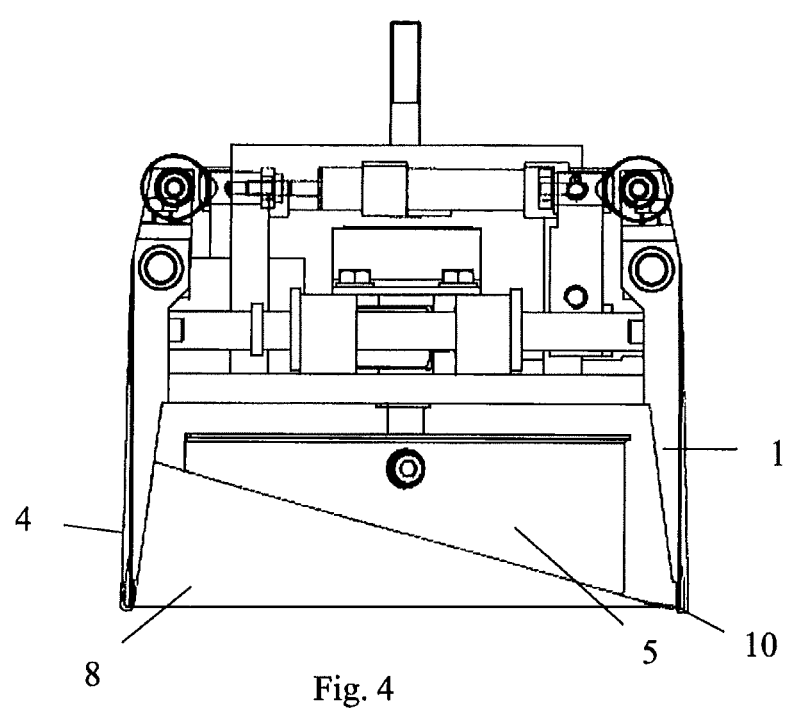
FIG. 4 is an end view of the gripping head of FIGS. 1-3 in a third, releasing position.

As used in this description the expressions "upper", "lower", "vertical", "horizontal" and similar expressions are in view of the gripping head as showed in the enclosed drawings.

On opposite sides of the gripping head of the present invention a side steering plate 1 and a pressure finger plate 2 are placed on each of said opposite sides. The side steering plate 1 has a number of steering plates 3 placed between fingers 4 of the pressure finger plate 2. The side steering plate 1 and pressure finger plate 2 at each side of the gripping head are placed together and interconnected. The side steering plate 1 and the pressure finger plate 2 at each side are generally placed in a common vertical plane. The fingers 4 of each pressure finger plate 2 are received in notches 17 of the side steering plate 1 arranged in connection with the pressure finger plate 2 in question. When the steering plate 1 is provided with notches 17 for receiving the fingers 4 of the pressure finger plate 2, such that the fingers 4 may pivot in the vertical plane around a horizontally arranged shaft 6, in between the steering plates 3, due to notches corresponding to the steering plates 3 in the pressure finger plate 2, pressure inwardly may to a greater extent be transferred to packages 8, thereby increasing friction between the fingers 4 and the packages thus increasing holding force.

At a first end of the gripping head a stop plate 5 is arranged between the ends of the opposite side steering plates 1 and pressure finger plates 2. The stop plate 5 is arranged moveable on a rod 11. The packages 8 received in the gripping head will act on the stop plate 5 to automatically place the stop plate 5 in the correct position. A mechanical stop is arranged on the rod 11 in order to limit the maximal turning angle of the stop plate 5. The rod 11 may also be moved by means of cylinders and/or servo motors, which may be hydraulic, pneumatic or electric. A person skilled in the art realizes that the rod 11 may be driven in many different ways, but as this does not form any part of the present invention as such, it is not discussed in detail herein. By amending the position of the stop plate 5 either by rotation and/or by raising or lowering, the gripping head may be adapted to packages 8 having different forms.

Figure 5:
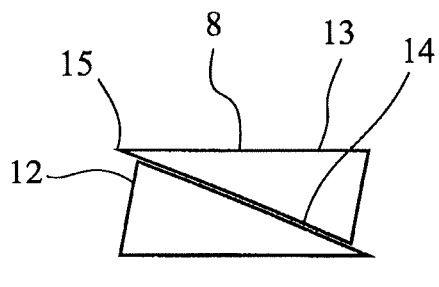
FIG. 5 is a side view of one example of packages to be handled by the gripping head of the present invention.
Figure 6:
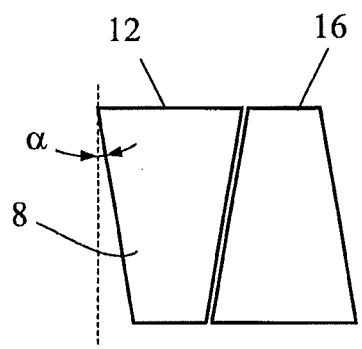
FIG. 6 is a plan view of the packages of FIG. 5.
Figure 7:
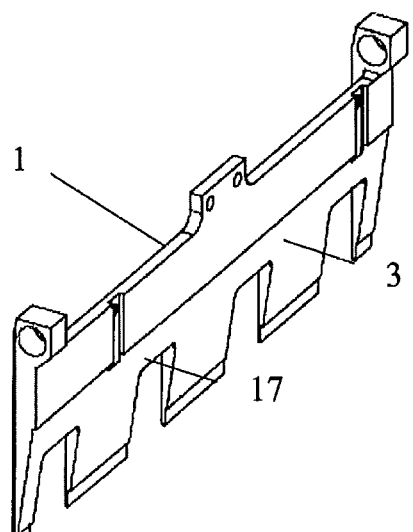
FIG. 7 is a perspective view of a part of the gripping head of FIGS. 1-4.
Figure 8:
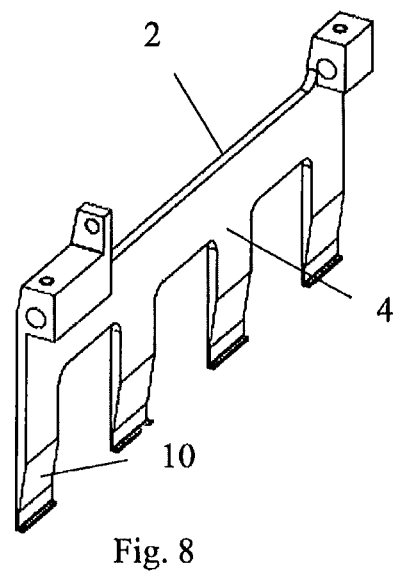
FIG. 8 is a perspective view of a further part of the gripping head of FIGS. 1-4.

At a second end of the gripping head opposite the stop plate 5, the gripping head is open, to receive a group of packages 8 from a grouping position. Thus, the side steering plates 1, the pressure finger plates 2 and the stop plate 5 has a U-form as seen in plan view. The group of packages 8 is normally brought into the gripping head by means of a conveyor belt. As indicated above normally the packages 8 will automatically place the stop plate 5 in a correct position as they are feed into the gripping head by means of the conveyor belt. The position of the stop plate 5, in the case of wedge shaped packages as are seen in FIG. 5, is at a slight angle α (see FIG. 6) such that the bottom and top edges of the packages are parallel with the side steering plates 1 and pressure finger plates 2 on opposite sides of the gripping head. Due to the packaging pattern, the stop plate will be switched to a corresponding angle α in the opposite direction for every layer, as the first package is always turned 180 degrees in relation to the first package in the previous layer.

The side steering plates 1 and pressure finger plates 2 are arranged movable. The side steering plate 1 and pressure finger plate 2 placed at one side of the gripping head are arranged mutually moveable. The fingers 4 may be turned away from the steering plates 3 in that the pressure finger plate 2 is turned by means of a cylinder 7 around the shaft 6, arranged at the upper end of the pressure finger plate 2.

Each side steering plate 1 has a number of steering plates 3, which steering plates 3 are to make contact with base ends 12 of the packages 8. In the shown embodiment each side steering plate 1 has three steering plates 3. Fingers 4 of the pressure finger plate 2 extend downwardly on both sides of each steering plate 3 and are received in notches 17 of the side steering plate 1. Thus, in the shown embodiment there are four fingers 4 and four corresponding notches 17 of the side steering plate 1. The steering plate 1 also extends outside the outermost fingers 4. At the lower end each finger 4 has an end 10 folded inwards. The folded end 10 of each finger 4 is directed towards the centre of the gripping head and will be placed below the lower end of the steering plates 3. The folded ends 10 are generally horizontal. The folded lower ends 10 of the fingers 4 are placed below the packages 8 in a gripping position. When the steering plate 1 is provided with notches 17 for receiving the fingers 4 of the pressure finger plate 2, such that the fingers 4 may pivot in the vertical plane around the horizontally arranged shaft 6, in between the steering plates 3, due to notches corresponding to the steering plates 3 in the pressure finger plate 2, the folded ends 10 of the fingers 4 may be kept relatively short, while still obtaining satisfactory holding force, since they do not need to extend beneath the steering plate 1. This structural feature also brings about the technical effect of eliminating the need of significant lateral movement of the finger plate 2 laterally beyond the steering plate 1. Instead, the lateral pivoting movement of the fingers 4 may be kept within the width of the steering plate 1, whereby basically only the steering plate 1 laterally limits vertical movement of the gripping head into spaces or boxes. Thus, packages 8 may be released from gripping action from the gripping head close to the surface of their intended position after movement, even in narrow boxes, thus minimizing the risk of damaging the packages 8 or their contents.

The side steering plates 1, pressure finger plates 2 and the stop plate 5 of each gripping head are arranged moveable by means of cylinders 7, for example around shafts 6. Often the cylinders are pneumatically driven. However, a person skilled in the art realises that the different plates 1, 2, 5 of the gripping head may be arranged moveable by many different methods, such as pneumatic, hydraulic or electric. As the means of driving as such does not form any part of the present invention it will not be extensively described here.

The gripping head of the present invention grips a unit or group of several packages 8. The gripping head of the invention has been developed with wedge like packages 8 in mind. In side view each package 8 has a base end 12, from the base end 12 two sides 13, 14 slope towards each other and form an apex 15 at the end opposite the base end 12. In the shown embodiment the width of the packages 8 are smaller at an end 16 of the apex 15 than at the base end 12, as seen in plan view.

In the units of packages 8 transported into the gripping head, every second package 8 is turned 180° in relation to the adjacent packages 8 of each unit of packages 8. Thus, the end 16 of the apex 15 of one package 8 is placed adjacent the base ends 12 of packages 8 placed beside it.

Each unit of packages 8 forms one layer in a box (not shown) in which the gripping head is to place the packages 8. The packages 8 are placed in the box with every second package 8 turned 180° in relation to the packages 8 placed above and/or below it, whereby the apex 15 of one package 8 is placed adjacent the base end 12 of the package placed above and/or below it. For a unit of packages 8 placed on a plane surface the base end 12 of each package 8 will be inclined. As indicated above a second unit of packages 8 is placed on the first unit of packages 8, with the packages 8 turned 180° in relation to the packages of the first unit, whereby the upper side of the combined two layers of packages 8 will be relatively plane (See FIG. 5.). When transferring a first set of wedge like packages 8 to secondary packages, it is especially important to release the packages 8 on the bottom or at least close to the bottom of the secondary package, since the wedge like shape of such packages otherwise will render the packages out of relative order, whereby further arrangement of a second set of packages 8 on top of the first set will be severely hampered. Instead, the disorder will be further increased when transferring the second set. This will adversely affect the packing efficiency in terms of the volume needed (occupied) for a specific number of packages. With the present invention it is possible to minimize the size of the secondary package.

The sides 9 of each steering plate 3, facing inwards in the gripping head, i.e. abutting packages inside the gripping head, slopes in the same extent as the base end 12 of a package 8 placed on a surface. Thereby it will be full contact between the sloping sides 9 of the steering plate 3 and the base end 12 of a package 8. The inclined contact area between the steering plates 3 and the packages 8 facilitates the release of the packages 8.

In use a number of packages 8 are transported as a group or unit from a grouping position into the gripping head, normally by means of a conveyor belt. The unit of packages 8 are feed into the gripping head at the open end opposite the stop plate 5. As stated above each package 8 is turned 180° in relation to the packages 8 placed on either side of it. At this time the side steering plates 1 and the pressure finger plates 2 are at an outer position or first, open position. The unit of packages 8 are transported until they abut against the stop plate 5. When the unit of packages 8 has reached the stop plate 5, the side steering plates 1 and the pressure finger plates 2 are moved inwardly to a second, closed position. In said closed position the steering plates 3 will about against base ends 12 of the packages 8. By means of the steering plates 3 the packages 8 are brought to the desired positions for later placement in the box. At the same time the fingers 4 of the pressure finger plates 2 will be pressed against the packages 8. The folded ends 10 of the fingers 4 are placed under the packages 8 in this position. Thus, the packages 8 will be held in the gripping head in this position by means of the steering plates 3 abutting the packages 8, the fingers 4 pressed against the packages 8 and the folded ends 10 of the fingers 4 placed below the packages 8.

The gripping head is then moved into a box, with the unit of packages 8 firmly held. Thereafter the fingers 4 are turned into an open, release position, in which the fingers 4 are no longer pressed against the packages 8 and the folded ends 10 of the fingers 4 no longer are placed below the packages 8. The steering plates 3 will still abut the packages 8. Finally the gripping head is lifted from the box, whereby the steering plates 3 leave the abutment against the packages 8. Thanks to the inclined contact surface between the steering plates 3 and the packages 8, the contact will be broken quickly, and as the folded ends 10 of the fingers 4 are displaced from under the packages 8, the packages 8 will remain orderly placed inside the box when the gripping head is lifted.

The gripping head is then moved to receive a new unit of packages 8 transported from the grouping position. The side steering plate 1 and the pressure finger plate 2 are brought to the first, open position before the new unit of packages are received from the grouping position.

In one embodiment the box is placed directly below the gripping head. When the packages 8 have been gripped by the gripping head, the conveyor belt transporting the packages 8 into the gripping head is turned away or retracted. With the conveyor belt out of the way, the gripping head holding a unit of packages 8 is lowered into the box and the packages 8 are released. Then the gripping head goes up again into position for receiving a new unit of packages 8 and the conveyor belt goes back into position for delivering the next unit of packages 8. A person skilled in the art realizes that the movement of the gripping head into the box receiving the packages may be arranged in many different ways.

The gripping head will continue to move groups of packages 8 to the box until the box have been filed. Then the filled box is replaced with an empty box to be filled by means of the gripping head of the present invention.

The invention claimed is:

1. A gripping head for a number of packages, comprising: side steering plates and pressure finger plates on two opposite sides of the gripping head, wherein each side steering plate comprises a number of steering plates, wherein each pressure finger plate comprises a number of fingers placed on either side of the steering plates and configured to move together with the pressure finger plate, received in notches of the side steering plate, wherein the gripping head further comprises a movable stop plate placed between a first end of the side steering plates and pressure finger plates, wherein a second end of the side steering plates and pressure finger plates opposite the first end is open, and wherein the stop plate is arranged on a shaft having a maximum turning angle rotatable about a substantially vertical axis.

2. The gripping head of claim 1, wherein each finger has a folded lower end placed below the lower edge of the side steering plate and which folded lower end is generally horizontal and folded inwards towards a centre of the gripping head.

3. The gripping head of claim 2, wherein the side steering plate and the pressure finger plate at each side are placed in a common vertical plane and wherein the side steering plate and pressure finger plate at each side are arranged mutually moveable.

4. The gripping head of claim 3, wherein each pressure finger plate is arranged to be turned around a shaft by a cylinder and wherein the pressure finger plate can be turned at least an amount corresponding with the folded lower end of each finger being moved away from the lower edge of the side steering plate.

5. The gripping head of claim 1, wherein a position of the stop plate is adjustable both in height and angle in relation to the side steering plates and the pressure finger plates and wherein the stop plate is arranged on a shaft that is moveable both in a vertical and a rotational direction.

6. The gripping head of claim 1, wherein a side of the side steering plate facing inwards, so as to face packages inside the gripping head, has the same inclination as a base end of a package to be gripped by the gripping head.

7. A method of transferring a number of packages from a first, gripping position to a second, releasing position by a gripping head, comprising transporting the number of packages as a group into the gripping head with the gripping head in a first open position, in which position a side steering plate and a pressure finger plate on a first side of the gripping head and a side steering plate and a pressure finger plate on a second side of the gripping head, opposite said first side, are turned outwards to said first open position of the gripping head and transporting the group of packages to abut against a stop plate of the gripping head, the method further comprising, after the transporting of the group of packages to abut the stop plate, turning the side steering plates and pressure finger plates inwards to a second, closed position, in which position steering plates of the side steering plates and fingers of the pressure finger plates abut ends of the packages and wherein folded ends of the fingers are extended below the packages.

8. The method of claim 7, further comprising, after the turning of the side steering plates and the pressure finger plates, moving the gripping head to said second, releasing position, in which position the pressure finger plates are turned in relation to the each other in such an extent that the folded lower ends of the fingers will no longer be placed below the packages.

9. The method of claim 8, further comprising, after moving the gripping head to the second position, lifting the gripping head from the group of packages, whereby the release of the packages is facilitated by the contact areas between the side steering plates and the packages being inclined.

10. The method of claim 7, wherein the packages have a wedge-like form.

* * * * *